(12) United States Patent
Gomez Casco et al.

(10) Patent No.: US 12,372,661 B2
(45) Date of Patent: Jul. 29, 2025

(54) COMPUTER IMPLEMENTED METHOD FOR DETECTING GLOBAL NAVIGATION SATELLITE SYSTEM SIGNAL SPOOFING, A DATA PROCESSING APPARATUS, A COMPUTER PROGRAM PRODUCT, AND A COMPUTER-READABLE STORAGE MEDIUM

(71) Applicant: The European Union, Represented by the European Commission, Brussels (BE)

(72) Inventors: David Gomez Casco, Leiden (NL); Gonzalo Seco Granados, Barcelona (ES); Jose Antonio Lopez Salcedo, Barcelona (ES); Ignacio Fernanez Hernandez, Brussels (BE)

(73) Assignee: THE EUROPEAN UNION, REPRESENTED BY THE EUROPEAN COMMISSION, Brussels (BE)

( * ) Notice: Subject to any disclaimer, the term of this patent is extended or adjusted under 35 U.S.C. 154(b) by 399 days.

(21) Appl. No.: 18/007,041

(22) PCT Filed: Jul. 12, 2021

(86) PCT No.: PCT/EP2021/069344
§ 371 (c)(1),
(2) Date: Jan. 26, 2023

(87) PCT Pub. No.: WO2022/023010
PCT Pub. Date: Feb. 3, 2022

(65) Prior Publication Data
US 2023/0305167 A1    Sep. 28, 2023

(30) Foreign Application Priority Data
Jul. 31, 2020    (EP) .................................. 20188808

(51) Int. Cl.
*H04L 1/00*     (2006.01)
*G01S 19/11*    (2010.01)
(Continued)

(52) U.S. Cl.
CPC .......... *G01S 19/215* (2013.01); *G01S 19/115* (2019.08); *G01S 19/243* (2013.01)

(58) Field of Classification Search
CPC ......... G06N 3/08; G01S 19/13; G01S 19/115; G01S 19/28; G01S 19/252; G01S 19/20;
(Continued)

(56) References Cited

U.S. PATENT DOCUMENTS

2019/0109749 A1*  4/2019  Bai .................... H04L 27/2644
2021/0208286 A1*  7/2021  Turpin .................... G01S 3/74

OTHER PUBLICATIONS

International Search Report and Written Opinion received for PCT Application No. PCT/EP2021/069344 on Feb. 3, 2022, 11 pgs.
(Continued)

*Primary Examiner* — Phuoc H Doan
(74) *Attorney, Agent, or Firm* — Merchant & Gould P.C.

(57) ABSTRACT

A computer-implemented method is for detecting Global Navigation Satellite System (GNSS) signal spoofing. The method includes storing sample sequences of the predictable part and of the unpredictable part of a GNSS signal at a GNSS receiver. The predictable part includes predictable bits and the unpredictable part includes unpredictable bits. The value of the unpredictable bits from which the unpredictable sample sequences are extracted is verified. A first and a second partial correlation between the unpredictable, respectively predictable, sample sequences and a locally stored GNSS signal replica are computed. A predefined metric from the complex valued partial correlations is calculated. The predefined metric is compared with a predefined threshold value. In a zero-delay replay attack, the spoofer estimates the unpredictable bits introduced by a (Continued)

GNSS authentication protocol and introduces distortion into the signal. Detecting this distortion indicates whether the signal under analysis is being spoofed or is authentic.

14 Claims, 8 Drawing Sheets

(51) Int. Cl.
  *G01S 19/21* (2010.01)
  *G01S 19/24* (2010.01)
(58) Field of Classification Search
  CPC .......... G01S 19/42; G01S 19/30; G01S 19/41; H04B 7/1855; H04B 7/195
  See application file for complete search history.

(56) References Cited

OTHER PUBLICATIONS

International Preliminary Report on Patentability received for PCT Application No. PCT/EP2021/069344 on Nov. 7, 2022, 7 pgs.
Fernandez-Hernandez Ignacio et al: "Galileo NMA signal unpredictability and anti-replay protection", 2016 International Conference on Localization and GNSS (ICL-GNSS), IEEE, Jun. 28, 2016 (Jun. 28, 2016), pp. 1-5, XP032938891, DOI: 10.1109/ICL-GNSS.2016.7533686.
Todd E Humphreys: "Detection Strategy for Cryptographic GNSS Anti-Spoofing", IEEE Transactions on Aerospace and Electronic Systems, IEEE Service Center, Piscataway, NJ, US, vol. 49, No. 2, Apr. 1, 2013 (Apr. 1, 2013), pp. 1073-1090, XP011499584, ISSN: 0018-9251, DOI: 10.1109/TAES.2013.6494400 pp. 1077-1082, section IV.

\* cited by examiner

COMPUTER IMPLEMENTED METHOD FOR DETECTING GLOBAL NAVIGATION SATELLITE SYSTEM SIGNAL SPOOFING, A DATA PROCESSING APPARATUS, A COMPUTER PROGRAM PRODUCT, AND A COMPUTER-READABLE STORAGE MEDIUM

This application is a National Stage Application of PCT International Patent application No. PCT/EP2021/069344, filed Jul. 12, 2021, which claims the benefit of priority to European patent application Serial No. 20188808.8, filed Jul. 31, 2020, which applications are incorporated herein by reference. To the extent appropriate, a claim of priority is made to each of the above disclosed applications.

TECHNICAL FIELD

The present invention relates to a computer implemented method for detecting Global Navigation Satellite System (GNSS) signal spoofing. The present invention further relates to a data processing apparatus for doing the same, and a computer program product and a computer-readable storage medium both comprising instructions for the same.

BACKGROUND ART

Global Navigation Satellite System (GNSS) spoofing attacks are an intentional interference with the aim to manipulate the Position, Velocity and Time (PVT) of a target GNSS receiver. Galileo has recently adopted the Open Service Navigation Message Authentication (OSNMA) functionality (Fernandez-Hernandez, I., Rijmen, V., Seco-Granados, G., Simon, J., Rodriguez, I., & Calle, J. D. (2016). A Navigation Message Authentication Proposal for the Galileo Open Service. *Journal of the Insitute of Navigation* (Spring), pp. 85-102). In this functionality, the E1B signal component sent from a Galileo satellite includes unpredictable bits in order to allow GNSS receivers to detect spoofing attacks.

A kind of spoofing attack is disclosed in Humphreys, Todd E. "Detection strategy for cryptographic GNSS anti-spoofing" IEEE Transactions on Aerospace and Electronic Systems 49, no. 2 (2013): 1073-1090. More specifically, a Security Code Estimation and Replay (SCER) attack is disclosed which comprises two steps. First, the spoofer tracks the received signals from the GNSS satellites and estimates the values of the unpredictable bits of each satellite in view. Second, the spoofer generates a set of GNSS signals that are transmitted to the target GNSS receiver, in order to take control of the tracking loops, and eventually the user position.

Generating an SCER attack is far from a trivial task for the spoofer since the spoofed signal must be synchronized with the authentic signal. If the two signals are not aligned with each other in the time domain when the spoofer starts the attack, it can be detected at the receiver by using the target receiver clock. This occurs because the stability of the receiver clock is well-known and high variations of clock offset in a short period of time at the PVT stage are a known side-effect that may be caused by a spoofer. As such, in order to perform the SCER attack and not to be detected by the receiver clock, the spoofer can perform zero-delay attacks, which are based on transmitting a signal that is practically synchronized with the authentic signal received by the target receiver. By doing so, the spoofer can control the target receiver.

Fernández-Hernández, Ignacio, and Gonzalo Seco-Granados. "Galileo NMA signal unpredictability and anti-replay protection" 2016 International Conference on Localization and GNSS (ICL-GNSS), IEEE, 28 Jun. 2016 propose the use of Navigation Message Authentication (NMA) to protect against replay attacks. In this method, a receiver stores the first samples of every unpredictable bit, thus creating a sequence whose correlation gain will be lower if the tracked signal has been replayed by a spoofer. In other words, this method measures the gain degradation when tracking the unpredictable bits. There is a brief suggestion in this disclosure to compare the gain based on an unpredictable sequence with the gain based on a predictable sequence as a test statistic for detecting a zero-delay attack, but no disclosure is made in relation to the detection probability of such a test statistic.

US 2011/102259 A1 discloses a method for countering GNSS spoofing by triggering an indicator when outliers are identified, such as GNSS bit flips or unexpected signal correlation profiles.

Other methods for detecting GNSS signal spoofing are also known in the art such as disclosed in U.S. Pat. No. 7,956,803 and EP 3 495 848 A1, which methods rely on comparing the GNSS signal with information obtained from alternate sources.

U.S. Pat. No. 7,956,803 discloses a method for detecting GNSS signal spoofing. The method comprises providing information to a wireless device, the information allowing the wireless device to determine navigation data message from a reference network. The method further comprises receiving navigation data from the GNSS network and comparing the navigation data from the GNSS network with that derived from the reference network to determine if one or more of the GNSS signals have been spoofed.

EP 3 495 848 A1 discloses a method to detect GNSS signal spoofing by comparing a first GNSS signal with a second non-GNSS signal and using a threshold to detect signal spoofing.

DISCLOSURE OF THE INVENTION

It is an object of the present invention to provide an improved method of detecting GNSS signal spoofing, in particular zero-delay SCER attacks.

This object is achieved according to the invention with a computer-implemented method for detecting Global Navigation Satellite System (GNSS) signal spoofing, the method comprising: a) digitizing, acquiring and tracking, at a receiver, a GNSS signal from at least one GNSS satellite, the GNSS signal comprising a predictable part and an unpredictable part, wherein the predictable part comprises predictable bits and the unpredictable part comprises unpredictable bits; b) storing, by the receiver, a sample sequence $y_{pred}^*(n)$ of the predictable part and a sample sequence $y_{unpred}^*(n)$ of the unpredictable part of the GNSS signal; c) verifying, by the receiver, the value of the unpredictable bits from which the unpredictable sample sequences are extracted; d) computing, by the receiver, a first partial correlation $B'_{unpred}(k)$ between the unpredictable sample sequences and a locally stored GNSS signal replica $x(n)$ and a second partial correlation $B'_{pred}(k)$ between the predictable sample sequences and the locally stored GNSS signal replica $x(n)$ by $$B'_{unpred}(k) = \sum\nolimits_{n=1}^{samples} y_{unpred}^*(n) * x(n); \text{ and}$$

$$B'_{pred}(k) = \sum\nolimits_{n=1}^{samples} y_{pred}^*(n) * x(n),$$

and removing a sign of the first partial correlation and the second partial correlation by $B_{unpred,pred}(k)=b(k) B'_{unpred,pred}(k)$ where b(k) is the value of the bit; e) calculating, by the receiver, a predefined metric R from the first and the second partial correlation, the predefined metric R being any one of:

$$R_2 = \left| \frac{\sum_{k=1}^{N_b} B_{unpred}(k)}{\sum_{k=1}^{N_b} B_{pred}(k)} - 1 \right|;$$

$$R_3 = \left| \frac{1}{N_b} \sum_{k=1}^{N_b} (B_{unpred}(k) - B_{pred}(k)) \right|;$$

$$R_4 = |C/N_{0_{unpred}} - C/N_{0_{pred}}|; \text{ and}$$

$$R_5 = \left\| \text{atan2}\left(\sum_{k=1}^{N_b} im(B_{unpred}(k)), \sum_{k=1}^{N_b} re(B_{unpred}(k))\right) - \text{atan2}\left(\sum_{k=1}^{N_b} im(B_{pred}(k)), \sum_{k=1}^{N_b} re(B_{pred}(k))\right) \right\|,$$

where $N_b$ is the number of unpredictable bits of which a sample sequence has been stored in step b), where $$C/N_0 = 10\log_{10}\left(\frac{1}{T_{coh}} \frac{NP-1}{N_b - NP}\right)$$

with $T_{coh}$ being the coherent integration time to compute the partials correlation, with $$NP = \frac{NBP}{WBP}$$

where $$WBP = \left(\sum_{k=1}^{N_b} |B_x(k)|^2\right) \text{ and } NBP = \left(\left|\sum_{k=1}^{N_b} B_x(k)\right|^2\right),$$

and with $B_x(k)$ being the partial correlation of any part of the bit; and f) comparing the predefined metric with a predefined threshold value to detect GNSS signal spoofing.

In an embodiment of the present invention, step b) comprises: storing, as an unpredictable sample sequence, a sample sequence $y_{unpred}*(n)$ of the beginning part of an unpredictable bit and storing, as a predictable sample sequence, a sample sequence $y_{pred}*(n)$ of a later part (i.e. any other part excluding the initial part), such as the end part, of the unpredictable bit; or storing, as an unpredictable sample sequence, a sample sequence $y_{unpred}*(n)$ of the beginning part of an unpredictable bit and storing, as a predictable sample sequence, a sample sequence $y_{pred}*(n)$ of a predictable bit.

In an embodiment of the present invention, $W_{u,d}$ is the duration of a single one of the stored unpredictable sample sequences (i.e. the duration of the sample taken at the beginning of the unpredictable bit) and $W_{p,d}$ is the duration of a single one of the stored unpredictable sample sequences (i.e. the duration of the sample taken at the end of the unpredictable bit or the duration of the sample from any other part of the unpredictable bit or of a predictable bit). Preferably, $W_{u,d}$ and/or $W_{p,d}$ are greater than 0.05 ms, preferably greater than 0.1 ms, and more preferably greater than 0.12 ms and smaller than 1 ms, preferably smaller than 0.75 ms, and more preferably smaller than 0.6 ms. Most preferred durations for the stored samples are between 0,125 and 0.5 ms.

In an embodiment of the present invention, step b) comprises storing sample sequences representing at least a part of at least 50, preferably at least 100, more preferably at least 150, and most preferably at least 200 bits for the unpredictable sample and/or for the predictable sample.

In an embodiment of the present invention, the predefined threshold is based on a cumulative density function of the metric R under the hypothesis that the GNSS signal is authentic, preferably the predefined 20 threshold is set to a value leading to a false alarm probability of 0,02.

In an embodiment of the present invention, step f) comprises authenticating the GNSS signal when no signal spoofing is detected preferably by: authenticating the GNSS signal when its predefined metric is below the predefined threshold; and detecting GNSS signal spoofing when its predefined metric is above the predefined threshold.

In an embodiment of the present invention, step a) comprises receiving GNSS signals from at least four different GNSS satellites, the GNSS signals comprising spreading codes and satellite data, the satellite data including the unpredictable part and wherein the method further comprises: g) calculating, by the receiver, the GNSS signals' time of arrival from the spreading codes; and h) calculating, by the receiver, its position, velocity and time by demodulating the satellite data.

In an embodiment of the present invention, step f) comprises authenticating the GNSS signal when no signal spoofing is detected preferably by: authenticating the GNSS signal when its predefined metric is below the predefined threshold; and detecting GNSS signal spoofing when its predefined metric is above the predefined threshold, and wherein steps g) and h) are performed only when at least four GNSS signals from at least four different GNSS satellites have been authenticated.

In an embodiment of the present invention, step b) comprises storing the sample sequence $y_{unpred}*(n)$ of the unpredictable part of the GNSS signal based on randomly selected unpredictable bits; or step d) comprises calculating the first partial correlation $B'_{unpred}(k)$ between the unpredictable sample sequences and a locally stored GNSS signal replica x(n) based on a randomly selected subset of the unpredictable sample sequences.

This object is achieved according to the invention with a data processing apparatus, in particular a GNSS signal receiver, comprising means for carrying out the method described above.

This object is achieved according to the invention with a computer program product comprising instructions which, when the program is executed by a computer, cause the computer to carry out the method described above.

This object is achieved according to the invention with a computer-readable storage medium comprising instructions which, when executed by a computer, cause the computer to carry out the method described above.

It will be readily appreciated that one or more of the above embodiments may be readily combined with one another.

The present inventors have realized that, in a zero-delay SCER attack, the spoofer has a need to estimate the unpredictable bits introduced by OSNMA with an almost zero delay. Due to this, the spoofer introduces a slight distortion into the signal, which distortion is the basis of the present GNSS signal spoofing detection method.

More specifically, due to the fact that the spoofer cannot know the value of the unpredictable bits a priori, the signal transmitted by the spoofer includes some errors, especially in the first microseconds of the unpredictable bit. The inventors have realized that they can detect this error by computing a first partial correlation between unpredictable sample sequences (in particular the beginning part of an unpredictable bit) and the corresponding local replica together with a second partial correlation between predictable sample sequences (in particular the end part of an unpredictable bit) and the corresponding local replica. In particular, various metrics have been defined to compare the first correlation with the second correlation, which metrics indicate (upon comparison with a threshold value) whether the signal under analysis is being replayed (i.e. spoofed) or is authentic.

It has been found that (as described in more detail below) the metrics according to the present invention (i.e. based on the partial correlations) achieve better results than the gain-based test metric suggested in Fernández-Hernández, Ignacio, and Gonzalo Seco-Granados. "Galileo NMA signal unpredictability and anti-replay protection" 2016 International Conference on Localization and GNSS (ICL-GNSS), IEEE, 28 Jun. 2016. A possible reason for the better performance may be that the partial correlations are complex values, while the gain (although derived from the partial correlations) is a real value and thus includes less information on the received signal.

Using the end part of the unpredictable bit as a predictable sample sequence is beneficial since time-dependent signal impairment variations (e.g. multipath or non-intentional interference) are minimized in this way.

Moreover, using only randomly selected unpredictable bits or randomly selected stored unpredictable sample sequences improves the robustness of the detection capability of the GNSS signal spoofing method and avoids that the spoofer exploits knowledge of which unpredictable bits are used in the detection method.

BRIEF DESCRIPTION OF THE DRAWINGS

The invention will be further explained by means of the following description and the appended figures.

DESCRIPTION OF THE INVENTION

Figure 1:
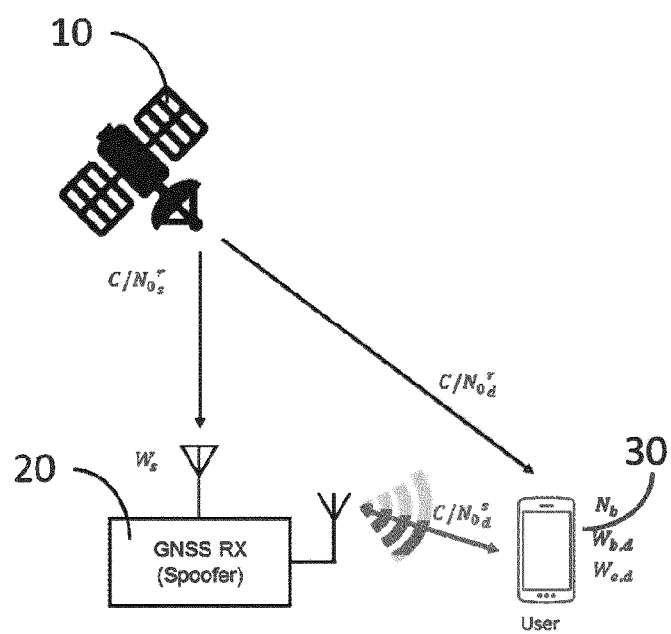
FIG. 1 shows a representative example of a spoofing attack for one satellite.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes. The terms so used are interchangeable under appropriate circumstances and the embodiments of the invention described herein can operate in other orientations than described or illustrated herein.

Furthermore, the various embodiments, although referred to as "preferred" are to be construed as exemplary manners in which the invention may be implemented rather than as limiting the scope of the invention.

FIG. 1 shows a representative example of a spoofing attack for one satellite 10 and table 1 below provides a definition of each parameter indicated in FIG. 1. The Global Navigation Satellite System (GNSS) satellite 10 broadcasts its GNSS signal which are received both by the spoofer 20 and the GNSS receiver 30. The spoofer 20 then generates and broadcasts its own GNSS signal in order to take control of the GNSS receiver 30.

TABLE 1

Parameter definition for spoofing zero-delay attack on GNSS signals including unpredictable symbols

| Variables | Definition |
|---|---|
| $C/N_{0_s}^r$ | $C/N_0$ of the real signal received by the spoofer. |
| $C/N_{0_d}^r$ | $C/N_0$ of the real signal received by the user. |
| $C/N_{0_d}^s$ | $C/N_0$ of the spoofed signal received by the user. |
| $W_s$ | Time while the spoofer does not know the value of the unpredictable bit. |
| $N_b$ | Number of unpredictable bits used in spoofing detection techniques. |
| $W_{b,d}$ | Duration of the partial cross-correlation used at the beginning of the bit. |
| $W_{e,d}$ | Duration of the partial cross-correlation used at the end of the bit. |

In general, spoofing detection is a binary hypothesis testing problem, which can be modelled under two hypotheses, namely the spoofer is present ($H_1$) or absent ($H_0$), as:

$$y(n) = \begin{cases} \sum_{p=1}^{N_{sat}} A_p b(n-\tau_p) c(n-\tau_p) e^{j(2\pi f_{d,p} + \varphi_p)} + \\ \sum_{l=1}^{N_{spof}} \beta_l \tilde{b}(n-\tau_l) c(n-\tau_l) e^{j(2\pi f_{d,l} + \varphi_l)} + \omega(n) & (H_1) \\ \sum_{p=1}^{N_{sat}} A_p b(n-\tau_p) c(n-\tau_p) e^{j(2\pi f_{d,p} + \varphi_p)} + \omega(n) & (H_0) \end{cases}$$

where y(n) is the received signal, $N_{sat}$ is the number of satellites, $A_p$ is the signal amplitude, $B_l$ is the amplitude of the spoofing signal, $b(n-\tau_p)$ is the unpredictable bit, $c(n-\tau_p)$ is the pseudorandom noise code, $f_{d,p}$ is the Doppler frequency, $\varphi_p$ is the phase, $N_{spof}$ is the number of satellites used to perform the spoofing attack, $\tilde{b}(n-t_l)$ is the unpredictable bit transmitted by the spoofer and $\omega(n)$ is additive white Gaussian noise.

As the present invention is mainly focused on zero-delay Security Code Estimation and Replay(SCER) attacks, we assume that the spoofer uses a $f_{d,l}=f_{d,p}$ and $\tau_l=\tau_p$ but $A_p$ and $\varphi_p$ can be different from $\beta_l$ and $\varphi_l$. We assume that our spoofer can control the spoofed signal amplitude $\beta_l$ and make it equal to $A_p$ in some cases, but it cannot align the carrier phase measurement to the real one, as aligning carrier phase measurements requires a very high level of accuracy. There are two further model assumptions. Firstly, we assume that the receiver is tracking authentic signals at the start of the attack, i.e. the receiver starts up and performs acquisition in a controlled environment. Although spoofing at acquisition is a relevant case, most of the time GNSS receivers are in the tracking stage. Secondly, we assume that, in the zero-delay SCER attack, the spoofer does not force signal reacquisition. A spoofer forcing reacquisition to take control of the loops would need the signal to be lost for more than one minute to properly estimate the unpredictable bits from the onset. Moreover, in these conditions, taking control of the loops would lead to cycle slips, which may be detected by the GNSS receiver.

As described above, the inventors realized that the weakness of zero-delay attacks is that the signal transmitted by the spoofer includes some errors in the first part of the unpredictable bits. In order not to be detected easily by the target receiver, the spoofer can mainly perform three kinds of attacks, namely an estimated value attack, a random value attack, and a zero value attack as illustrated in FIGS. 3A to 3C.

Figure 3A:
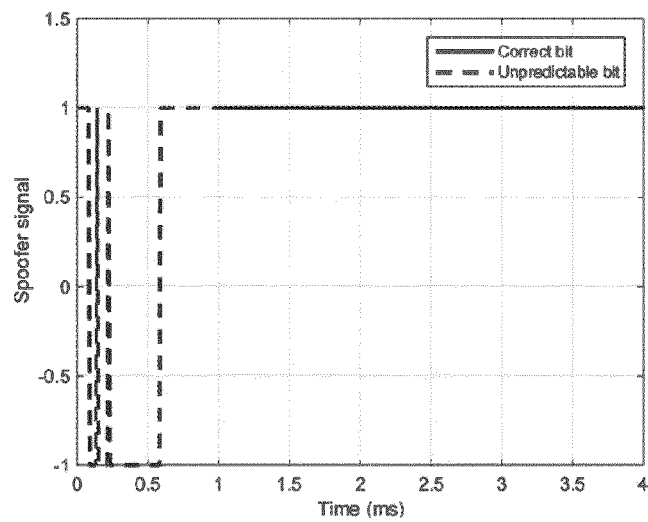
FIGS. 3A to 3C illustrate three different kinds of zero-delay SCER attacks.

An estimated value attack is illustrated in FIG. 3A. The spoofer tries to estimate the unpredictable bit sample by sample and introduces this estimation in the spoofed signal. By doing so, the first part of the bit would contain several changes of sign because it is not feasible to obtain a reliable estimation of the bit, but after a reasonable number of samples, the spoofer provides the real value of the unpredictable bit.

Figure 3B:
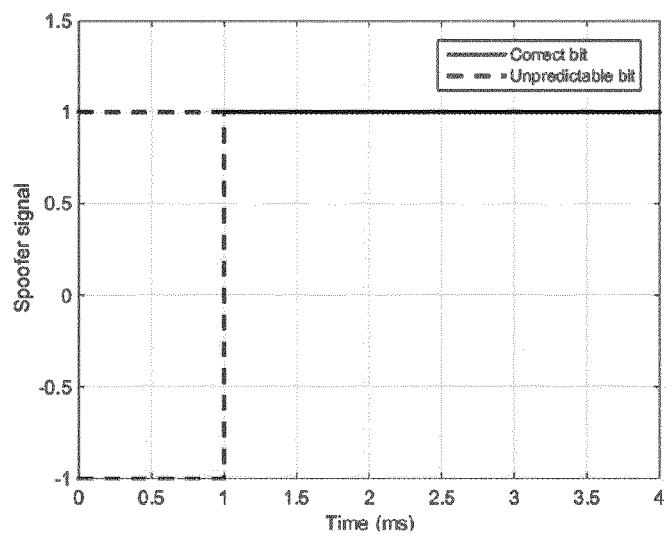

A random value attack is illustrated in FIG. 3B. The spoofer introduces a random value of 1 or −1 at the beginning of the bit during a short period of time and when the spoofer has a reliable estimation of the unpredictable bit value, it is included in the rest of the bit.

Figure 3C:
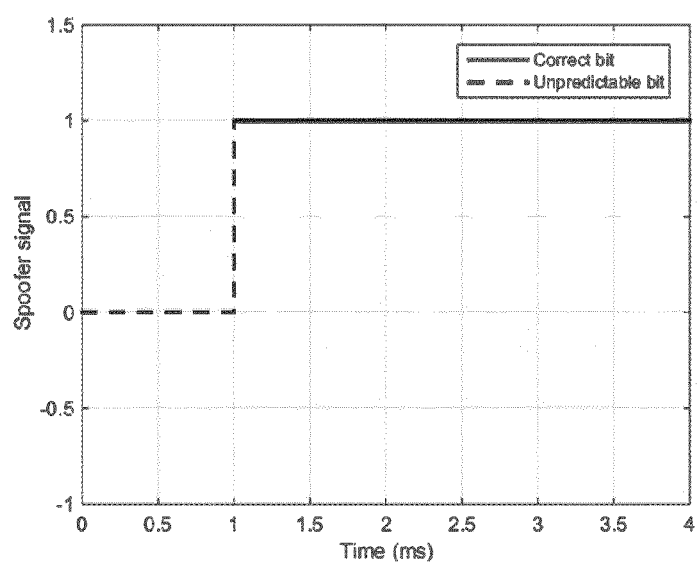

A zero value attack is illustrated in FIG. 3C. The spoofer introduces a value of 0 at the beginning of the bit during a short period of time and when the spoofer has estimated the unpredictable bit value, it is included in the rest of the bit.

Notice that in FIGS. 3A, 3B and 3C, the period while the spoofer generates a random value or zero is the parameter Ws defined in Table 1.

Figure 2:
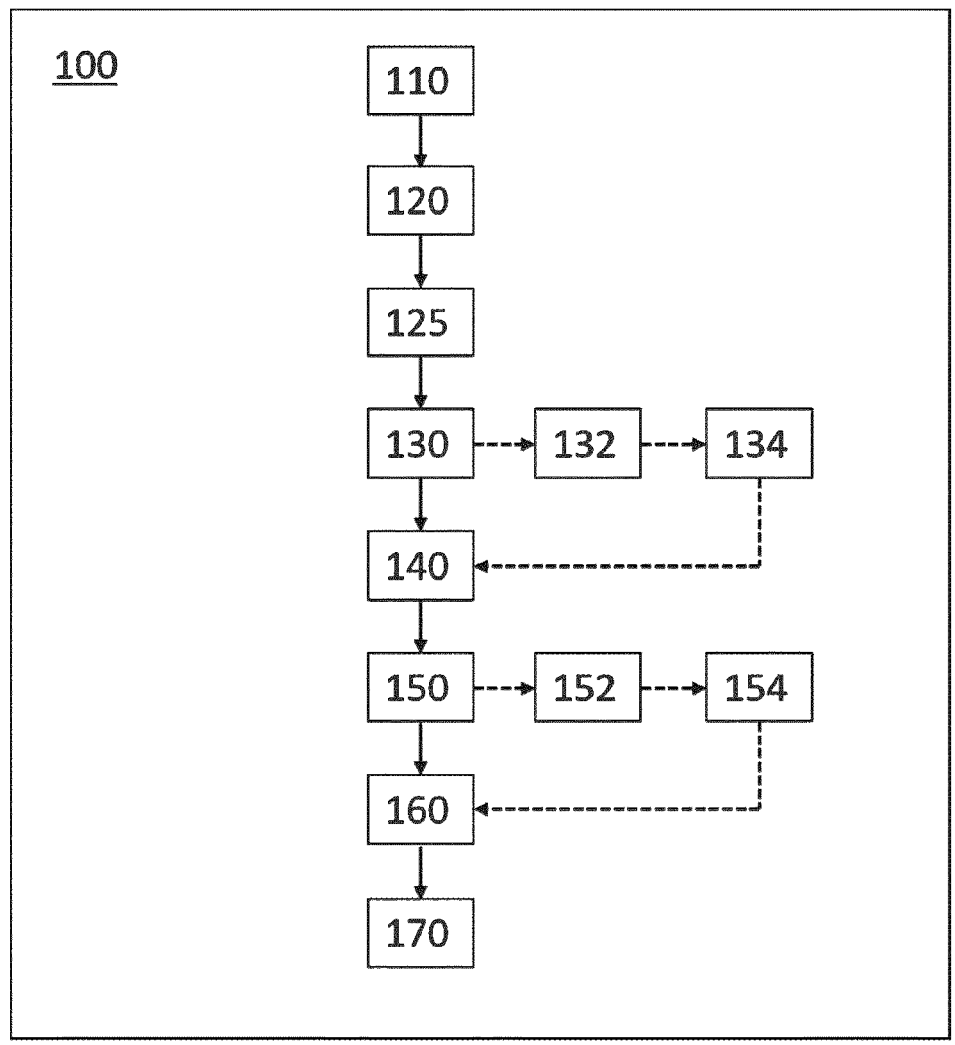
FIG. 2 shows a flow-chart representing a GNNS signal spoofing detection method according to the present invention.

FIG. 2 shows a flow-chart representing a GNSS signal spoofing detection method 100 according to the present invention. In step 110, the GNSS receiver digitizes, acquires and tracks a GNSS signal from at least one GNSS satellite, the GNSS signal comprising a predictable part and an unpredictable part, wherein the predictable part comprises predictable bits and the unpredictable part comprises unpredictable bits. Methods for digitizing, acquiring and tracking GNSS signals are known in the art and will not be described further.

In step 120, the receiver stores a sample sequence $y_{pred}*(n)$ of the predictable part and a sample sequence $y_{unpred}*(n)$ of the unpredictable part of the one or more tracked GNSS signals. In the embodiment described below, the stored sequences are part of the same unpredictable bit. In other words, the initial part of the unpredictable bit is stored as an unpredictable sample sequence $y_{unpred}*(n)=y_{beg}*(n)$ and the end part of the unpredictable bit is stored as a predictable sample sequence $y_{pred}*(n)=Y_{end}*(n)$. As described above, although the predictable sample sequence is obtained from an unpredictable bit, the non-initial part (i.e. not the beginning part) of the unpredictable bit is typically correctly estimated by the spoofer and it is therefore considered predictable.

In step 125, the receiver verifies the value (i.e. the bit values) of the unpredictable part of the signal, i.e. the value of the unpredictable bits from which the unpredictable sample sequences are extracted. More specifically, although usually all unpredictable bit values will be verified, it will be readily appreciated that the method according to the invention only requires that at least the unpredictable bit values of which a sample sequence is stored are verified. This may save computing resources in the receiver. This unpredictable part verification can be performed by a GNSS authentication protocol such as the OSNMA functionality in Galileo.

In step 130, the receiver computes a first partial correlation between the unpredictable sample sequences and a locally stored GNSS signal replica and a second partial correlation between the predictable sample sequences and the locally stored GNSS signal replica. Preferably, step 130 only occurs after the unpredictable bits have been verified in step 125.

The computation of the partial correlations is done in step 132 using the following equations:

$$B'_{unpred}(k) = \sum_{n=1}^{samples\_b} y^*_{unpred}(n)x_{unpred}(n); \text{ and}$$

$$B'_{pred}(k) = \sum_{n=1}^{samples\_e} y^*_{pred}(n)x_{pred}(n),$$

where $y_{unpred}*(n)$ and $y_{pred}*(n)$ are the unpredictable and the predictable samples during $W_{u,d}$ and $W_{p,d}$ respectively, of the received signal in one code period, $x_{unpred}(n)$ and $x_{pred}(n)$ are the corresponding local replicas, and samples_u and samples_p indicate the total number of unpredictable, respectively predictable, stored samples. Please note that samples_u and samples_p need not be the same. In this way, the partial correlations represent the initial part and the last part of the unpredictable bit.

In subsequent step 134, $B_{unpred}(k)$ and $B_{pred}(k)$ are defined which correspond to the partial cross-correlation after removing the sign of the unpredictable bit by $B_{unpred}(k)=b(k) B'_{unpred}(k)$; and $B_{pred}(k)=b(k) B'_{pred}(k)$, where $b(k)$ is the value of the unpredictable bit (1,-1).

In step 140, the receiver computes one or more from a number of predefined metrics R using the partial correlations after sign removal. Several metrics are described below.

An intuitive way of detecting spoofing would be to compare the satellite code gain based on several unpredictable bits to that obtained from various predictable bits as suggested in Fernández-Hernández, Ignacio, and Gonzalo Seco-Granados. "Galileo NMA signal unpredictability and anti-replay protection" 2016 International Conference on Localization and GNSS (ICL-GNSS), IEEE, 28 Jun. 2016. One manner to perform this comparison (i.e. the gain comparison) is computing the ratio of $N_b$ sums of partial correlations. Then, the absolute value of the ratio between the two metrics is computed:

$$R_1 = \left| \frac{\sum_{k=1}^{N_b} B_{unpred}(k)}{\sum_{k=1}^{N_b} B_{pred}(k)} \right|.$$

If the spoofer is present, $R_1$ should be close to 0; but if the spoofer is absent, it should be close to 1. However, one drawback of the metric $R_1$ is that it can provide any value in $H_1$ if the received signal includes the spoofed signal and the authentic one with different values of phase, which different phase value behavior is best represented in the complex part of the complex valued partial correlations.

In order to solve this problem, the present invention relies on four other metrics $R_2$-$R_5$ that are based on comparing the complex valued partial correlations rather than the real valued gain. A first metric $R_2$ is:

$$R_2 = \left| \frac{\sum_{k=1}^{N_b} B_{unpred}(k)}{\sum_{k=1}^{N_b} B_{pred}(k)} - 1 \right|.$$

The idea behind $R_2$ is that, if the spoofer is absent, $R_2$ is close to 0, but if the spoofer is present, $R_2$ is larger. This facilitates the definition of the detection threshold.

An additional metric is $R_3$, which consists in computing the mean of the difference between the initial and final partial correlations:

$$R_3 = \left| \frac{1}{N_b} \sum_{k=1}^{N_b} (B_{unpred}(k) - B_{pred}(k)) \right|.$$

If $R_3$ is a large value, the spoofer is present. However, if $R_3$ is a small value, the spoofer is absent.

Another interesting metric $R_4$ deals with the comparison of the carrier-to-noise (C/N$_0$) estimate of the initial part of an unpredictable bit to the estimate of other parts of the signal that are considered predictable. To estimate the C/N$_0$, the well-known Narrow-band Wide-band Power Ratio (NWPR) estimator may be used. Basically, it requires evaluating the ratio between the signal wideband power WBP to its narrowband power NBP:

$$NP = \frac{NBP}{WBP},$$

where $$WBP = \left( \sum_{k=1}^{N_b} |B_x(k)|^2 \right) \text{ and } NBP = \left( \left| \sum_{k=1}^{N_b} B_x(k) \right|^2 \right)$$

with $B_x(k)$ being the partial correlation of any part of the bit, e.g. the initial part and the end part of the unpredictable bit. Finally, the carrier-to-noise (C/N$_0$) estimate can be estimated as:

$$C/\tilde{N}_0 = 10\log_{10}\left( \frac{1}{T_{coh}} \frac{NP - 1}{N_b - NP} \right),$$

where $T_{coh}$ is the coherent integration time to compute the partial correlations. The predefined metric $R_4$ is based on the difference of C/N$_0$ estimates of the predictable and unpredictable parts of a bit:

$$R_4 = |C/\tilde{N}_{0_{beg}} - C/\tilde{N}_{0_{end}}|.$$

The spoofing attack can be detected using this metric since, if the spoofing attack is absent, the metric above must be a value close to 0 while, if the spoofer attack is present, the magnitude of this metric must provide larger values.

A final metric $R_5$ only uses the phases of the initial and final partial correlations:

$$R_5 = \left| \operatorname{atan2}\left( \sum_{k=1}^{N_b} im(B_{unpred}(k)), \sum_{k=1}^{N_b} re(B_{unpred}(k)) \right) - \operatorname{atan2}\left( \sum_{k=1}^{N_b} im(B_{pred}(k)), \sum_{k=1}^{N_b} re(B_{pred}(k)) \right) \right|.$$

If the presence of the spoofed signal modifies the phase of the received signal, the spoofer can be detected using this metric.

In step 150, the receiver compares the predefined metric R with a predefined threshold value to detect GNSS signal spoofing. In practice, the threshold is set in such a way that a predefined false alarm probability is obtained, e.g. a false alarm probability of 0,02 or any other desired value. It will be readily appreciated that the threshold values (and the corresponding false alarm probabilities) may be different for each of the above described metrics R. For example, for metric $R_3$, the threshold may be set to a value leading to a false alarm probability of 0,02 and the signal may be authenticated in step 152 when metric $R_3$ is below the threshold and may be considered as a spoofed signal in step 154 when metric $R_3$ is above the threshold.

In general, the predefined threshold value is linked to the false alarm probability $P_{fa}$=0,02 and may be determined for each metric R by deriving cumulative density function of the metric R under the null hypothesis (i.e. the spoofer is absent). A more detailed example is described below.

The method illustrated in FIG. 2 further includes step 160 where the receiver calculates the GNSS signals time of arrival from the spreading codes and step 170 where the receiver calculates its position, velocity and time by demodulating the satellite data. This is normally done by using GNSS signals from at least four different GNSS satellites, each GNSS signal comprising spreading codes and satellite data, the satellite data including the unpredictable part. Preferably, steps 160 and 170 are only done after the GNSS signals from at least four satellites have been authenticated in step 150.

It will be readily appreciated that, in other embodiments, the predictable sample sequence may be obtained from other parts of the signal, for example from (parts of) predictable bits and/or from other parts (i.e. not the initial or end part) of unpredictable bits.

A spoofer knowing beforehand which unpredictable bits, and which parts of them, are to be correlated, could exploit this advantage. First, because it could implement a random value attack with a variable power, depending on the success or failure of the previous guess; and second, because it could alter the predictable correlations to spoof the detector. Both advantages can be mitigated by the randomization of the correlations. In other words, in some embodiments, not all stored sample sequences need to be used in the calculation of the metrics R. For example, a randomized number of unpredictable bits are not used. This improves the robustness of the detection capability of the GNSS signal spoofing method, especially in case the spoofer is expecting this kind of defence.

It will be appreciated that the above description focussed on a single spoofing signal for only one satellite. However, the method may readily be used for detecting multiple spoofing signals at the same time. In fact, since, as illustrated below, the method according to the present invention is able to detect a single spoofing signal, it will operate even better for detecting spoofing in case the spoofer wants to consistently spoof a full PVT solution as this would require successfully spoofing multiple satellite signals at the same time.

In what follows, a performance analysis is presented on the different metrics under the presence of zero-delay attacks where the $R_1$ metric is used to as a baseline comparison representative of the prior art and where the $R_2$-$R_5$ represent the invention. What follows are the results of the simulation of the spoofing detection capabilities of the proposed $R_1$-$R_5$ metrics under the most relevant attack situations. The results presented constitute the most difficult-to-detect spoofing scenarios, in terms of spoofing power advantage and type of attack. The spoofing simulation parameters are presented in table 2 below. Regarding the attack types, out of the three attacks previously described, we focus on the estimated value attack to carry out the simulations presented, as it provides an upper bound for the required number of unpredictable bits compared to the other two attacks. This attack consists in estimating the unpredictable bit sample by sample and introducing this estimation in the spoofed signal. The estimation of the unpredictable bit carried out by the spoofer can be easily performed at the tracking stage by using the following expression as $$\hat{b}(m) = \mathrm{sign}\left(\mathrm{Re}\left\{\sum_{n=1}^{m} y_{beg}^{*}(n) x_{beg}(n)\right\}\right).$$

By doing so, the spoofer obtains an estimation of the bit for each m.

A variant of this attack consists in estimating the bit sample by sample, and after that, transmitting the estimation of the bit by using a scalar factor, depending on the level of confidence of the attacker. This sub-case has also been analyzed and it does not significantly differ from the standard estimated value attack.

We also assess the cases in which the spoofer has a $C/N_0$ advantage of up to 5 dB with respect to the receiver. Concerning the relative power between the spoofed and real signal, we assess the cases of same power, and +3 dB power for the spoofed signal. The results are tested for AWGN channels, with a realistic number of visible GPS and Galileo satellites. In the simulation, we use a threshold value leading to a false alarm probability equal to 0,02 because it provides a good benchmark for comparing the various metrics.

TABLE 2

Parameterization of spoofing simulations

| Zero-delay Attack type | Estimated value attack |
|---|---|
| $C/N_{0_s}^{r}$ | 0 dB advantage; + 3 dB advantage; + 5 dB advantage with respect to $C/N_{0_d}^{r}$ |
| $C/N_{0_d}^{s}$ | Same power as $C/N_{0_d}^{r}$; +3 dB with respect to $C/N_{0_d}^{r}$ |
| $W_{b,d}$; $W_{e,d}$ | 0.125 ms; 0.25 ms; 0.5 ms. |
| Channel model | AWGN |
| Signals model | 5 Galileo E1B-E1C signals and 8 GPS signals; as per Eq. (1). Only one Galileo satellite is spoofed. |
| $P_{fa}$ | 0.02 |

In all cases, the spoofing detection probability $P_d$ is measured for different number of bits $N_b$ under different combinations of these parameters.

Figure 4:
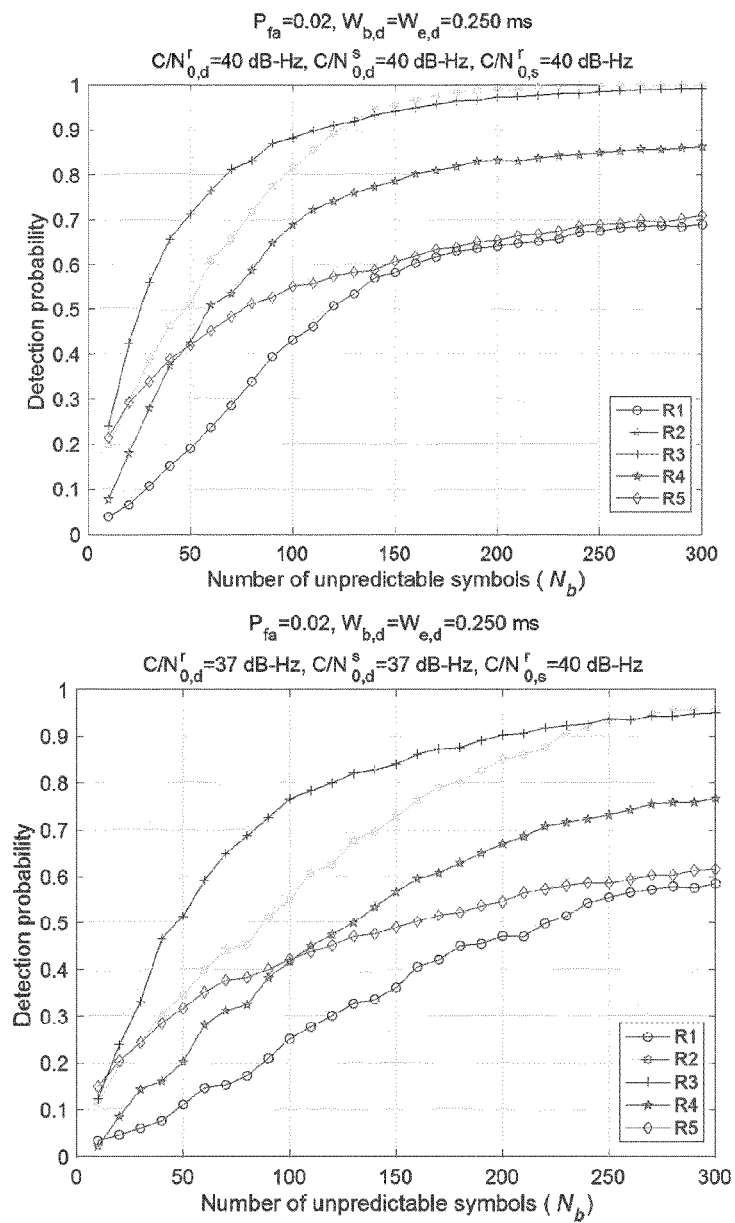
FIG. 4 shows the detection probability versus the number of unpredictable bits for a false alarm probability of 0,02. On the top plot, the user and spoofer receive signals at the same power. On the bottom plot, the spoofer has a 3-dB advantage.

FIG. 4 shows the probability of detecting the spoofing attack vs the number of unpredictable bits for a false alarm probability of 0,02, with a 250-ms correlation per bit. These figures are based on the estimate value attack and consider that the user receives both the real and spoofed signals. On the top figure, the spoofer receives the signal from the satellite with the same power as the user, whereas on the bottom figure the spoofer receives the signal with higher power (3 dB) than the user. The figure shows that the $R_2$ and $R_3$ techniques provide the best performances. When the spoofer has an advantage of 3 dB with respect to the user's receiver, the $R_2$ and $R_3$ detectors can detect the spoofing attack with a detection probability of 0,9 using 200 and 220 bits, respectively. However, if the spoofer receives the signal with the same power as the user receiver, the user receiver can detect the spoofing attack using 100 and 120 bits approximately using the $R_2$ and $R_3$ techniques, respectively. Note that the $R_1$ metric performs poorer than all other metrics and especially with a low number of unpredictable symbols Np.

Figure 5:
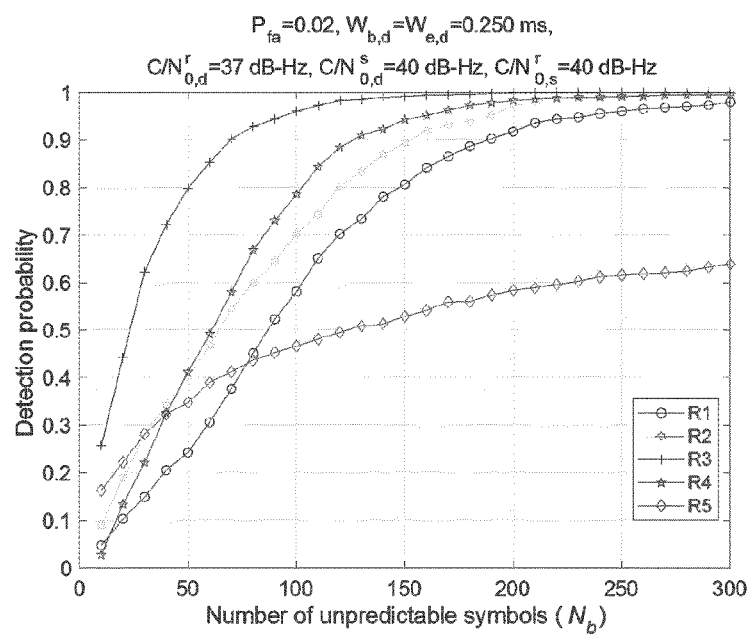
FIG. 5 shows the detection probability versus the number of unpredictable bits for a false alarm probability of 0,02. The spoofed signal is received at 3 dB more power than the real signal.

The previous simulation considers that the user receives the signal from the spoofer and the satellite with the same power. Nevertheless, for the plot of the top of FIG. 5, we assume that the user receives the signal transmitted by the spoofer with 3 dB more than the one transmitted by the satellite. In this scenario, the user receiver can detect the spoofing attack more easily than in the previous simulation. When the spoofer has an advantage of 3 dB with respect to the user's receiver and the user receives the same signal power from the spoofer and the satellite, the $R_3$ metric needs 200 bits to detect the spoofing attack for a detection probability of 0,9 (FIG. 4, bottom plot). However, when the user receives the signal from the spoofer with 3 dB more than the one transmitted from the satellite, $R_3$ only requires 65 bits to detect the spoofing attack for a detection probability of 0,9 (FIG. 5). In these conditions, the best detector is $R_3$. It is worth mentioning that in this simulation the performance of $R_1$ is not so poor due to the fact that the user's receiver receives more power from the spoofer than the satellite.

Figure 6:
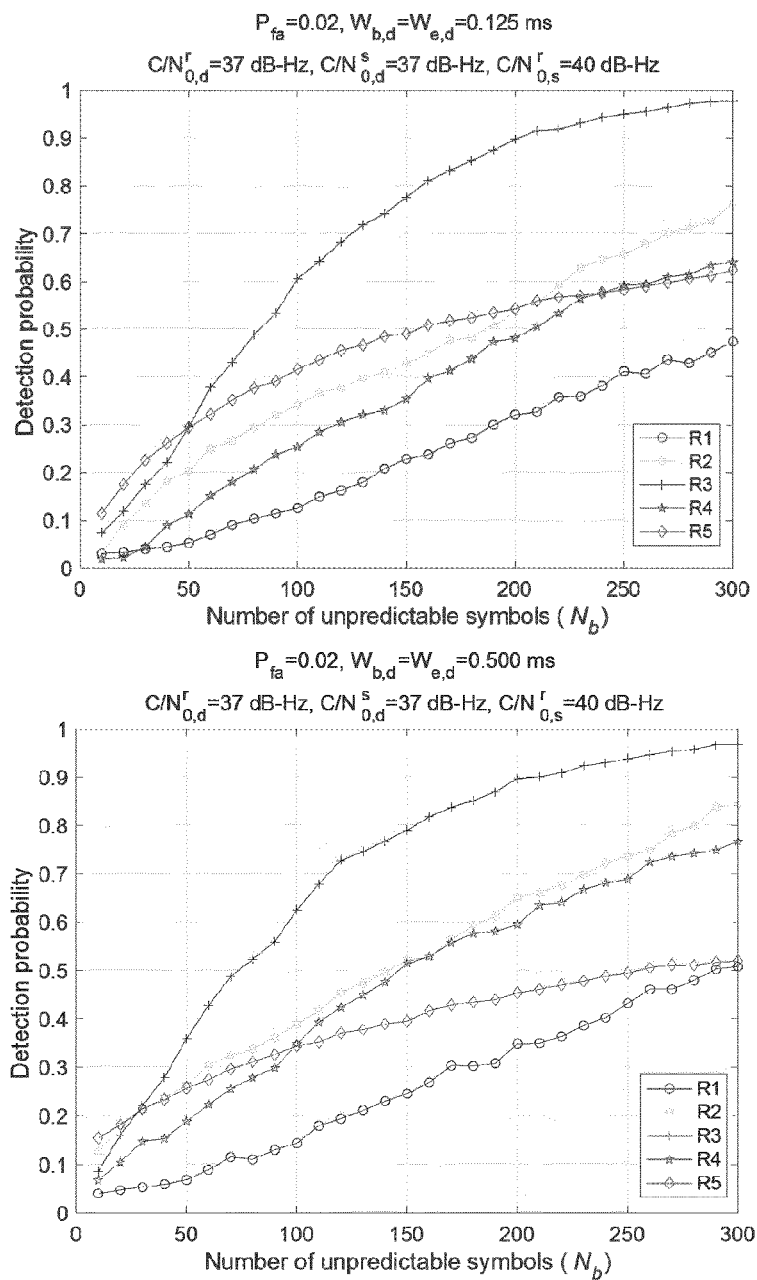
FIG. 6 shows the detection probability versus the number of unpredictable bits for false alarm probability of a 0,02 and for a different length of windows (window length of 0,125 ms for the top plot and window length of 0,500 ms for the bottom plot). The spoofer has a 3-dB advantage with respect to the user.

In FIG. 6, we analyse how the performance of the detectors is affected by the use of different lengths of the windows used to compute the partial correlations: 0,125 ms (top) and 0,500 ms (bottom). Note that the case with a window length of 0,250 ms is illustrated in the bottom plot of FIG. 4. These correlations, while much shorter than the standard 4-ms Galileo E1 codes, ensure that there is sufficient gain for detection, even in case of cross-correlation noise from other satellites. The results show that $R_3$ provides very similar performance for different window lengths used to compute the partial correlations, while the others are more sensitive to this parameter. The metric $R_2$, which also exhibits promising performance in certain situations, is affected by the window length. If the window length is appropriate, it can offer very good performance. However, whether the time window is too short or large, this technique suffers some degradation in the detection probability.

The conclusion from the simulation analysis is that the $R_2$-$R_5$ metrics (which are based on the complex valued partial correlations) perform markedly better than the $R_1$ metric which is based on the gain (i.e. a real value obtained from the complex valued partial correlations). Furthermore, out of the proposed metrics, $R_3$ is one that performs best, and that it is robust enough against all situations, provided that it accumulates enough energy from sufficient bits. With a sufficient number of bits, on the order of 200, the detector can detect a spoofing attack with a probability higher than 90%, even when the spoofer has a power advantage over the user receiver.

One remaining aspect of the implementation of the method is defining the unpredictable parts, symbols, or bits, of the GNSS signal. The current Galileo OSNMA protocol aims at authenticating the satellite navigation data. We have considered a baseline use case of OSNMA of 2 MACK (Message Authentication Code and Key) blocks, 20-bit MACs, 96-bit keys, and 4 MACs per block. This configuration allows the receiver to have 80 unpredictable bits per 15-second MACK block, without taking into account the KEYs bits, and around 160 in a similar time, if the first 80 bits of the key are considered unpredictable. We can conclude that, even in the case that the key is predictable, the detector can be based on 30 or 45 seconds (i.e. 2 or 3 MACK blocks), in order to obtain 160 or 240 unpredictable bits. In light of the results of the simulation, we can see that, even in advantageous cases for the spoofer, (some of) the metrics can work. A receiver could decide to wait for two Galileo I/NAV subframes, for 60 seconds in total, providing 320 unpredictable bits, in order to increase confidence in the metric.

Since the $R_3$ metric seems the most promising metric to detect GNSS spoofing, in what follows an example is given on the computation of its detection threshold $\gamma$. The spoofer detection boils down to the comparison between the metric $R_3$ and a detection threshold to distinguish whether the user's receiver is being spoofed or not. The detection threshold is affected by the individual probability of false alarm:

$$P_{fa}=1-cdf_{R_3}(\gamma|H_0)$$

where $cdf_{R_3}(Y|H_0)$ is the cumulative density function of the metric of $R_3$.

The probability of false alarm requires the knowledge of the cumulative density function of $R_3$ under the null hypothesis $H_0$ (i.e. the spoofer is not present). When the spoofer is not present, the $R_3$ metric is very similar to Rayleigh distribution. This occurs because the value of the partial correlations at the beginning and the end of bit (or another predictable part of the signal) have practically the same constant value to which Gaussian noise is added. As such, the term inside the absolute value can be considered as a zero-mean complex Gaussian noise and the metric $R_3$ has a Rayleigh distribution. Exploiting the relation between the Rayleigh distribution and the underlying Gaussian variable, the mean of the Rayleigh distribution can be obtained from the standard deviation of the partial correlations in the predictable part $B_{end}(k)$. That is, the mean of the Rayleigh distribution is equal to $\sigma_B \sqrt{\pi/2}$, where $\sigma_B$ is the variance of $B_{end}(k)$. The detection threshold y can thus be defined as $$\gamma=cdf_{R_3}^{-1}(1-P_{fa}|H_0).$$

Figure 7:
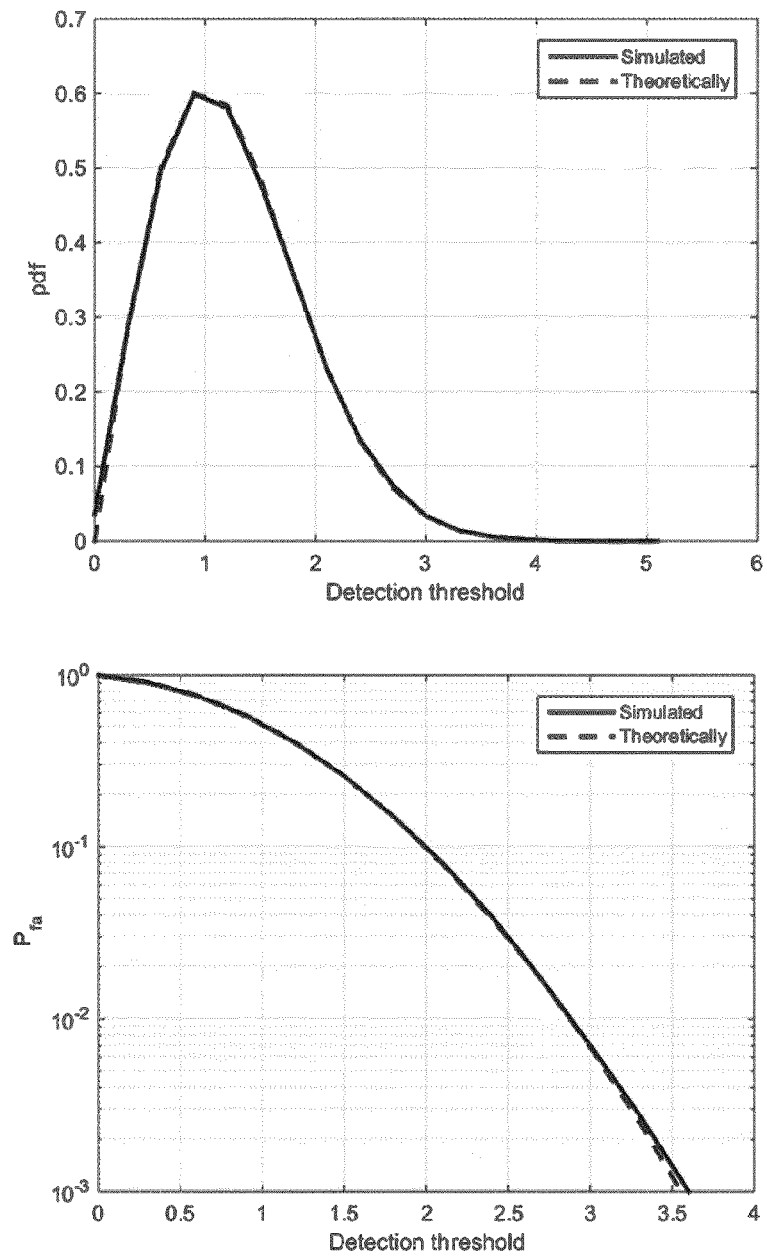
FIG. 7 shows a comparison between the probability density function (top plot) and the probability of false alarm (bottom plot) under the null-hypothesis of the metric $R_3$ and the probability of false alarm $P_{fa}$ obtained from Monte Carlo simulations and the theoretical one based on the Rayleigh expression.

FIG. 7 compares the theoretical and simulated probability density function (top plot) and the probability of false alarm (bottom plot) under the null-hypothesis of the metric $R_3$. The figure shows that the metric $R_3$ is indeed well approximated by a Raleigh distribution.

It will be readily appreciated that the above example of how to compute the threshold value for metric $R_3$ in order to have the desired probability of false alarm may also be applied to other metrics. Moreover, other threshold values may be used which are not linked to a false alarm probability and/or which are not based on cumulative density function of the metric.

Although the method according to the present invention has been described by reference to the Galileo OSNMA protocol, the invention should not be considered as limited thereto and the proposed method can also be applied to other protocols.

Although aspects of the present disclosure have been described with respect to specific embodiments, it will be readily appreciated that these aspects may be implemented in other forms within the scope of the invention as defined by the claims.

The invention claimed is:

1. A computer-implemented method for detecting Global Navigation Satellite System, signal spoofing, the method comprising:
   a) digitizing, acquiring and tracking, at a receiver, a GNSS signal from at least one GNSS satellite, the GNSS signal comprising a predictable part and an unpredictable part, wherein the predictable part comprises predictable bits and the unpredictable part comprises unpredictable bits;
   b) storing, by the receiver, a sample sequence $y_{pred}*(n)$ of the predictable part and a sample sequence $y_{unpred}*(n)$ of the unpredictable part of the GNSS signal;
   c) verifying, by the receiver, a value of the unpredictable bits from which the unpredictable sample sequences are extracted;
   d) computing, by the receiver, a first partial correlation $B'_{unpred}$ between the unpredictable sample sequences and a locally stored GNSS signal replica x and a second partial correlation $B'_{pred}(k)$ between the predictable sample sequences and the locally stored GNSS signal replica $x(n)$ by:

$$B'_{unpred}(k)=\Sigma_{n=1}^{samples}y_{unpred}*(n)*x(n); \text{ and}$$

$$B'_{pred}=\Sigma_{n=1}^{samples}y_{pred}*(n)*x(n),$$

and removing a sign of the first partial correlation and the second partial correlation by $B_{unpred,pred}(k)=b(k)B'_{unpred,pred}(k)$ where $b(k)$ is the value of the bit;
   e) calculating, by the receiver, a predefined metric R from the first and the second partial correlation, the predefined metric R being:

$$R_3=|1/N_b\Sigma_{k=1}^{Nb}(B_{unpred}(k)-B_{pred}(k)); \text{ and}$$

f) comparing the predefined metric with a predefined threshold value to detect GNSS signal spoofing.

2. The method according to claim 1, wherein step b) comprises:
   storing, as an unpredictable sample sequence $y_{unpred}*(n)$, a sample sequence $y_{beg}*(n)$ of a beginning part of an unpredictable bit and storing, as a predictable sample sequence $y_{pred}^*(n)$, a sample sequence $y_{end}^*(n)$ of a later part, such as the end part, of the unpredictable bit; or storing, as an unpredictable sample sequence $y_{unpred}^*(n)$, a sample sequence $y_{beg}^*$ of the beginning part of an unpredictable bit and storing, as a predictable sample sequence $y_{pred}^*(n)$, a sample sequence $y_{end}^*(n)$ of a predictable bit.

3. The method according to claim 1, wherein $W_{u,d}$ is a duration of a single one of the stored unpredictable sample sequences and $W_{p,d}$ is a duration of a single one of the stored predictable sample sequences.

4. The method according to claim 3, wherein $W_{u,d}$ and/or $W_{p,d}$ are greater than 0.05 ms, and smaller than 1 ms.

5. The method according to claim 1 wherein step b) comprises storing sample sequences representing at least a part of at least 50 bits for the unpredictable sample and/or for the predictable sample.

6. The method according to claim 1, wherein the predefined threshold is based on a cumulative density function of the metric R under the hypothesis that the GNSS signal is authentic.

7. The method according to claim 6, wherein the predefined threshold is set to a value leading to a false alarm probability of 0.02.

8. The method according to claim 1, wherein step f) comprises authenticating the GNSS signal when no signal spoofing is detected by:
authenticating the GNSS signal when its predefined metric is below the predefined threshold; and
detecting GNSS signal spoofing when its predefined metric is above the predefined threshold.

9. The method according to claim 1, wherein step a) comprises receiving GNSS signals from at least four different GNSS satellites, the GNSS signals comprising spreading codes and satellite data, the satellite data including the unpredictable part; and wherein the method further comprises:
g) calculating, by the receiver, the GNSS signals' time of arrival from the spreading codes; and
h) calculating, by the receiver, its a position, velocity and time by demodulating the satellite data.

10. The method according to claim 9, wherein step f comprises authenticating the GNSS signal when no signal spoofing is detected by:
authenticating the GNSS signal when its the predefined metric is below the predefined threshold; and
detecting GNSS signal spoofing when its the predefined metric is above the predefined threshold, and
wherein steps g) and h) are performed only when at least four GNSS signals from at least four different GNSS satellites have been authenticated.

11. The method according to claim 1, wherein step b) comprises storing the sample sequence $y_{unpred}^*(n)$ of the unpredictable part of the GNSS signal based on randomly selected unpredictable bits; or
wherein step d) comprises calculating the first partial correlation $B'_{unpred}(k)$ between the unpredictable sample sequences and a locally stored GNSS signal replica $x(n)$ based on a randomly selected subset of the unpredictable sample sequences.

12. A data processing apparatus, comprising means for carrying out the method of claim 1.

13. A non-transitive computer program product comprising instructions which, when the program is executed by a computer, cause the computer to carry out the method of claim 1.

14. A non-transitive computer-readable storage medium comprising instructions which, when executed by a computer, cause the computer to carry out the method of claim 1.

* * * * *